N. A. SEYMOUR & O. ALLEN.
Thill-Coupling.
No. 197,180.                    Patented Nov. 13, 1877.
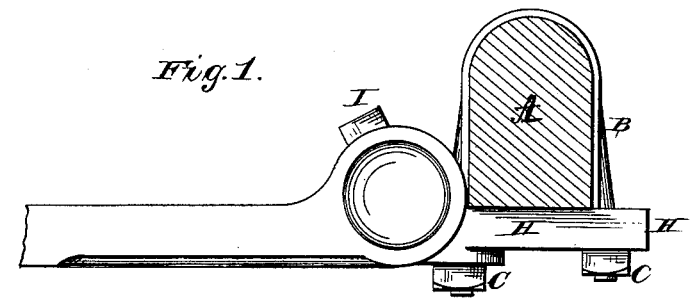
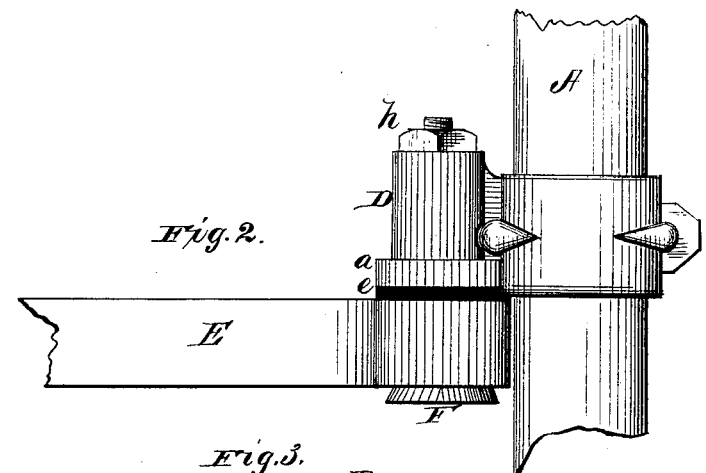
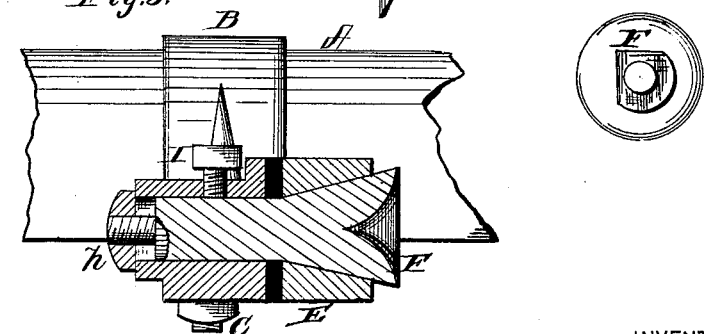

UNITED STATES PATENT OFFICE.

NORMAN A. SEYMOUR AND OSCAR ALLEN, OF MOUNT MORRIS, NEW YORK.

IMPROVEMENT IN THILL-COUPLINGS.

Specification forming part of Letters Patent No. 197,180, dated November 13, 1877; application filed October 20, 1877.

*To all whom it may concern:*

Be it known that we, NORMAN A. SEYMOUR and OSCAR ALLEN, of Mount Morris, in the county of Livingston, and in the State of New York, have invented certain new and useful Improvements in Thill-Couplings; and do hereby declare that the following is a full, clear, and exact description thereof, reference being had to the accompanying drawings, and to the letters of reference marked thereon, making a part of this specification.

The nature of our invention consists in the construction and arrangement of the several parts of a device for forming a thill-coupling for vehicles, as will be hereinafter fully set forth.

In the accompanying drawing, which makes a part of this specification, Figure 1 is an end view of a portion of the axle, showing clip. Fig. 2 is a bottom view of the several parts connected, and Fig. 3 is a section in the line of the bolt which passes through the shaft-iron.

To enable those skilled in the art to make our invention, we will proceed to describe it.

In the figures, A represents the axle, and B the clip, both of which may be made in any of the well-known and usual ways.

H represents the cross-piece which lies beneath the axle, and through which the ends of the clip pass. C C are the nuts which hold the cross-piece in place. This cross-piece is provided at its forward end with a metal sleeve, D, and a flange or collar, *a*. Through this sleeve D is passed the bolt for the shaft-iron.

E represents the shaft-iron, which has a conical-shaped eye to receive the bolt. F represents the bolt, which has a long conical-shaped head. A portion of the bolt which passes through the sleeve has one or more flat surfaces formed upon it, so that it may be held in place and prevented from revolving by a set-screw, I. This set-screw works through the sleeve. *h* represents a nut on the end of the bolt.

In using this coupling, the shaft-iron is placed at one end of the sleeve and the bolt F is passed through it, a washer, *e*, being first placed between the iron and the collar *a*. The bolt is held in place, first, by the nut *h* at its end, and has also the set-screw I, which makes it more secure. When either the bolt or the eye in the shaft-iron wear any, so as to produce noise or rattle, the nut *h* is screwed up tighter, so that the conical end of the bolt will fit more snugly in the eye of the iron.

Having thus fully described our invention, what we claim as new, and desire to secure by Letters Patent, is—

The combination with the clip B, of the cross-piece H, formed with the sleeve D and collar *a*, the thill-iron E, the conical-headed bolt F, flattened on one or more sides, the nut *h*, and the set-screw I, all constructed and arranged substantially as and for the purposes herein set forth.

In testimony that we claim the foregoing we have hereunto set our hands and seals this 3d day of October, 1877.

NORMAN A. SEYMOUR. [L. S.]
OSCAR ALLEN. [L. S.]

Witnesses:
WILLIAM R. HINDS,
GEO. C. BRANCH.